(12) United States Patent
Zhou

(10) Patent No.: US 11,745,487 B1
(45) Date of Patent: Sep. 5, 2023

(54) STICKING FILM, A FILM-STICKING TOOL AND A FILM-STICKING ASSEMBLY

(71) Applicant: Dongguan Pineapple Protection Co., Ltd., Dongguan (CN)

(72) Inventor: ShengJie Zhou, Dongguan (CN)

(73) Assignee: DONGGUAN PINEAPPLE PROTECTION CO., LTD., Dongguan (CN)

( * ) Notice: Subject to any disclaimer, the term of this patent is extended or adjusted under 35 U.S.C. 154(b) by 0 days.

(21) Appl. No.: 17/878,930

(22) Filed: Aug. 2, 2022

(30) Foreign Application Priority Data

May 16, 2022 (CN) .......................... 202221177877.4
Jun. 20, 2022 (CN) .......................... 202221551563.6

(51) Int. Cl.
*B32B 7/12* (2006.01)
*B32B 37/00* (2006.01)
*B32B 37/18* (2006.01)
*B32B 17/06* (2006.01)
*B32B 7/06* (2019.01)

(52) U.S. Cl.
CPC ............ *B32B 37/0046* (2013.01); *B32B 7/06* (2013.01); *B32B 17/06* (2013.01); *B32B 37/18* (2013.01); *B32B 2307/584* (2013.01); *B32B 2457/20* (2013.01)

(58) Field of Classification Search
CPC .... B32B 7/06; B32B 7/12; B32B 7/21; B32B 17/06
See application file for complete search history.

(56) References Cited

U.S. PATENT DOCUMENTS 9,701,096 B2 * 7/2017 Beaupre ................ B29C 66/861

FOREIGN PATENT DOCUMENTS

| CN | 204750661 U | 11/2015 | |
|----|-------------|---------|---|
| CN | 105766077 A | 7/2016 | |
| CN | 208776649 U * | 4/2019 | ............ B65D 65/40 |
| CN | 112793145 A | 5/2021 | |
| CN | 213109932 U | 5/2021 | |
| CN | 113428401 A | 9/2021 | |
| WO | 2015038883 A1 | 3/2015 | |

* cited by examiner

*Primary Examiner* — Elizabeth E Mulvaney
(74) *Attorney, Agent, or Firm* — Andrew C. Cheng

(57) ABSTRACT

The present disclosure relates to the technical field of film sticking, more particularly to a sticking film, a film-sticking tool and a film-sticking assembly. The sticking film includes a tempered film for attaching to the screen of an electronic product, and a release film layer attached to the tempered film. The release film layer is an electrostatic layer, the release film layer and the tempered film are separated when pasting, and the side of the release film layer that is attached to the tempered film generates static electricity to attract dust on the screen. Thus, static electricity can be generated when the release film layer and the tempered film are separated, which can attract dust on the screen of electronic products and clean the screen, and avoids dust particles from scratching the screen due to direct wiping of the screen, resulting in damage to the performance of the screen.

15 Claims, 17 Drawing Sheets

STICKING FILM, A FILM-STICKING TOOL AND A FILM-STICKING ASSEMBLY

TECHNICAL FIELD

The present disclosure relates to the technical field of film sticking, and more particularly to a sticking film, a film-sticking tool and a film-sticking assembly.

BACKGROUND

With the continuous development and innovation of science technology, electronic products have become an indispensable part in people's lives. When using electronic products, in order to prevent the screen of the electronic product from being scratched and broken, a tempered film will be pasted on the screen of the electronic product. Most of the existing films include a tempered film and a release film layer. Before the film is pasted, there are usually fine dust, stains, fingerprints and other pollutants on the screen. Users need to clean the screen of the electronic product first, and then attach the tempered film to the screen. At present, most cleaning ways are to use a wiping cloth to wipe off the pollutants on the screen, so when there are many dust particles on the screen, it is easy to cause friction between the dust particles and the screen during the wiping process, which will damage the screen and affect the performance of screen, and the cleaning effect is not good.

SUMMARY

To solve the problem that the screen cleaning effect is not good when pasting the film, the present disclosure provides a sticking film, a film-sticking tool and a film-sticking assembly.

To solve the above technical problems, the present disclosure provides a sticking film that includes a tempered film and a release film layer attached to the tempered film. The tempered film is used to be attached to a screen of an electronic product, and the release film layer is an electrostatic layer. When pasting, the release film layer and the tempered film are separated, and the side of the release film layer that is attached to the tempered film generates static electricity to attract dust on the screen.

Preferably, the sticking film further includes a tip or a pulling portion, the tempered film includes a sticking surface for attaching to the screen of the electronic product. The sticking surface is attached to the release film layer, the release film layer has ends in the width direction and the length direction thereof. The tip or the pulling portion is connected to one end of the release film layer. The tip and the release film layer are coplanar and not attached to the sticking surface, or part or all of the pulling portion is positioned on the side of the release film layer away from the sticking surface. The pulling portion extends along the length direction or the width direction of the release film layer.

Preferably, the end of the pulling portion connected with the release film layer is defined as a connecting end. The extension length of the pulling portion along the longitudinal direction is greater than the length dimension of the release film layer, or the extension length of the pulling portion along the width direction is greater than the width dimension of the release film layer. After the pulling portion is formed on the release film layer, there is a portion of the pulling portion extending beyond the end of the release film layer opposite to the connecting end.

Preferably, when the sticking film is positioned on the film-sticking tool, and when using the film-sticking tool to position the electronic product, the pulling portion is positioned between the release film layer and the screen. There is a space between the release film layer and the screen. When the pulling portion is pulled, the side of the release film layer attached to the sticking surface contacts the screen to attract dust.

Preferably, when the release film layer is torn off, the sticking surface of the release film layer is in pressing contact with the screen.

Preferably, when the release film layer is torn off, the release film layer is positioned between the tempered film and the screen in a curved shape.

Preferably, the pulling portion and the release film layer are arranged separately, and the pulling portion is connected to the side of the release film layer away from the sticking surface. The end of the release film layer and the pulling portion are superimposed to form a step, and the step contacts the screen to remove dust when pulling the pulling portion.

Preferably, the tempered film includes a first end and an opposite second end in the length direction or the width direction. The release film layer includes a sticking portion covering the sticking surface, and a connecting section extending beyond the first end or the second end. The connecting section is connected to the sticking portion. A folding line is provided to divide the connecting section into a first connecting section and a second connecting section, which are respectively connected to the sticking portion and the pulling portion. When the connecting section extends beyond the release film layer in the length direction, the folding line extends along the width direction of the tempered film; when the connecting section extends beyond the release film layer in the width direction, the folding line extends along the length direction of the tempered film. That is, the extension direction of the folding line is perpendicular to that of the connecting section. The first connecting section and the second connecting section are folded along the folding line to form the pulling portion on the side of the release film layer away from the sticking surface.

Preferably, the folding line is formed by a plurality of wire holes or wire grooves arranged at intervals.

Preferably, the release film layer is a PET material.

Preferably, the tempered film has antistatic properties.

Preferably, the sticking film further includes a protective layer, which is attached to the side of the tempered film away from the release film layer.

Preferably, the protective layer includes a covering portion covering the tempered film, and a positioning portion extends beyond the covering portion. The positioning portion is provided with a positioning member, which is used to cooperate with the film-sticking tool to position the sticking film.

Preferably, the tempered film includes a first end and an opposite second end. The film-sticking tool is provided with a fixing member matched with the positioning member. After the sticking film is positioned on the fixing member and the electronic product is positioned on the film-sticking tool, there is a height difference between the height of the first end of the tempered film relative to the screen and the height of the second end of the tempered film relative to the screen, the positioning member corresponding to the end with the larger height difference is closely matched with the fixing member, and the positioning member corresponding to the end with the smaller height difference is movably matched with the fixing member. The protective layer can fall on the screen under the gravity of the sticking film or an external force pressing in the direction of the screen.

Preferably, at the end with the smaller height difference, the distance between the release film layer and the screen is equal to the thickness dimension of the release film layer.

To solve the above technical problems, the present disclosure further provides a film-sticking tool, which is used for cooperating with the above sticking film to attach the tempered film on the screen of the electronic product.

Preferably, the film-sticking tool includes a base provided with a positioning slot for accommodating the electronic product to be filmed, and a pulling opening through which the pulling portion is extended.

Preferably, the base is provided with a fixing member for positioning the sticking film. Or the film-sticking tool further includes an upper cover that can be closed on the base, and the fixing member is disposed on the upper cover. After the electronic product is placed in the positioning slot and the sticking film is positioned on the fixing member, there is a height difference between the height of the first end of the tempered film relative to the screen and the height of the second end of the tempered film relative to the screen.

Preferably, the film-sticking tool further includes a lower cover, the upper cover is closed on the lower cover, the base is fixed in the lower cover, and the upper cover is disposed opposite to the screen after closed. One ends of the upper cover and the lower cover are rotatably connected, and a cutout is formed at the ends of the upper cover and the lower cover away from the connection therebetween to form the pulling opening.

To solve the above technical problems, the present disclosure further provides a film-sticking assembly, which includes the above sticking film and the above film-sticking tool, the sticking film can be positioned on the film-sticking tool to complete the sticking of the tempered film of the electronic product.

Compared with the prior art, the unidirectional free-pulling data cable of the present disclosure has the following beneficial effects.

A sticking film, which includes a tempered film and a release film layer attached to the tempered film. The tempered film is used to be attached to a screen of an electronic product, and the release film layer is an electrostatic layer. When pasting, the release film layer and the tempered film are separated, and the side of the release film layer that is attached to the tempered film generates static electricity to attract dust on the screen. By configuring release film layer as the electrostatic layer, the static electricity can be generated when the release film layer and the tempered film are separated, which can attract dust on the screen of electronic products and clean the screen, and avoids dust particles from scratching the screen due to direct wiping of the screen, resulting in damage to the performance of the screen.

A pulling portion is further provided, part or all of the pulling portion is positioned on the side of the release film layer away from the sticking surface, which provides a more convenient force for the operator to tear off the release film layer and avoids the contamination of the tempered film caused by fingers touching the tempered film when the release film is torn off.

After the pulling portion is formed on the release film layer, there is a portion of the pulling portion extending beyond the end of the release film layer opposite to the connecting end, so that the release film can be torn off after placing electronic products on the film-sticking tool. The time interval between tearing off the release film layer and attaching the tempered film is shorter, the operation steps are more consistent, and the time in contact with the air is shortened. The tearing and sticking of the film are almost at the same time, so as to avoid attaching to too much dust and improve the effect of the film pasting. During the process of tearing off the release film layer, the release film layer has static electricity to attract the dust on the screen.

The pulling portion and the release film layer are arranged separately, and the end of the release film layer and the pulling portion are superimposed to form a step. When pulling the pulling portion, the step contacts the screen to remove dust. By forming a step structure similar to the structure of a scraper, part of the dust, especially the larger size dust, can be scraped away first, and then combined with electrostatic attraction to achieve a better dust removal effect.

The arrangement of the folding line enables the first connecting section to fit more closely with the second connecting section after the connecting section is folded. In the thickness direction of the sticking film, the space occupied by the connecting section is reduced, which is convenient for the pulling of the pulling portion. The distance between the tempered film and the screen of the electronic product to be filmed is smaller, and the tempered film is easier to fit with the screen after pulling the pulling portion. At the same time, the connecting section is the part beyond the sticking surface, that is, the area thereof is larger than that of the sticking surface, so when the release film layer is pulled by the pulling portion, the connecting section is first curled. When reaching the release film layer, a curling inertial force to the release film layer is provided, so that the release film layer at this end is quickly curled and opposite to the screen, and quickly attracts dust.

The release film layer is a PET material, which is a material that is easy to generate static electricity by friction, and can well ensure that the release film layer can have static electricity when the release film layer and the tempered film are separated to improve the effect of dust attraction. In addition, the plasticity of the PET material is relatively strong, which can be prepared to have curling and bending properties. In the process of tearing off, the PET material is easy to fall on the screen, and static electricity is further generated by friction between the screen and the PET material, which further improves the dust removal effect.

The tempered film has antistatic properties, and the tempered film is configured to have antistatic properties, so that when the release film is separated from the tempered film, static electricity will not be brought on, and dust will not be attracted by the tempered film.

The positioning member is disposed on the protective layer to cooperate with the film-sticking tool to complete the film sticking, which can make good use of the film-sticking tool to align the sticking film with the electronic product to improve the effect of the film pasting.

The film-sticking box is cooperated with the sticking film. After positioning the sticking film on the fixing member, there is a height difference between the height of the first end of the tempered film relative to the screen and the height of the second end of the tempered film relative to the screen. The positioning member corresponding to the end with the larger height difference is closely matched with the fixing member, and the positioning member corresponding to the end with the smaller height difference is movably matched with the fixing member, which can well control the attachment direction of the tempered film. The tempered film at the end with the smaller height difference is attached to the screen first to prevent the tempered film at the higher end from falling off automatically, which can ensure that the tempered film is gradually attached to the screen from the end with the smaller height difference to the higher end.

The film-sticking tool includes a base provided with a positioning slot for accommodating the electronic product to be filmed, and a pulling opening through which the pulling portion is extended. The film-sticking tool matched with the sticking film has a pulling opening, after positioning the electronic product, the pulling portion can be pulled to tear off the release film layer, so that the process of tearing off and film pasting are almost simultaneously performed, and the film-sticking quality is improved.

The film-sticking tool is a film-sticking box, and after the cover is closed, the sticking film is limited in a closed space. The upper cover has a certain extrusion limit on the sticking film, which can well make the release film layer curl between the tempered film and the screen during the process of tearing, and there is a certain squeezing contact force with the screen to have friction with the screen, thereby further generating static electricity and better taking away the dust on the screen. At the same time, release film layer can be tightly attached to the screen to prevent dust from the uncleaned area of the screen from flying over and sticking on the tempered film, causing pollution to the tempered film.

Figure 1:
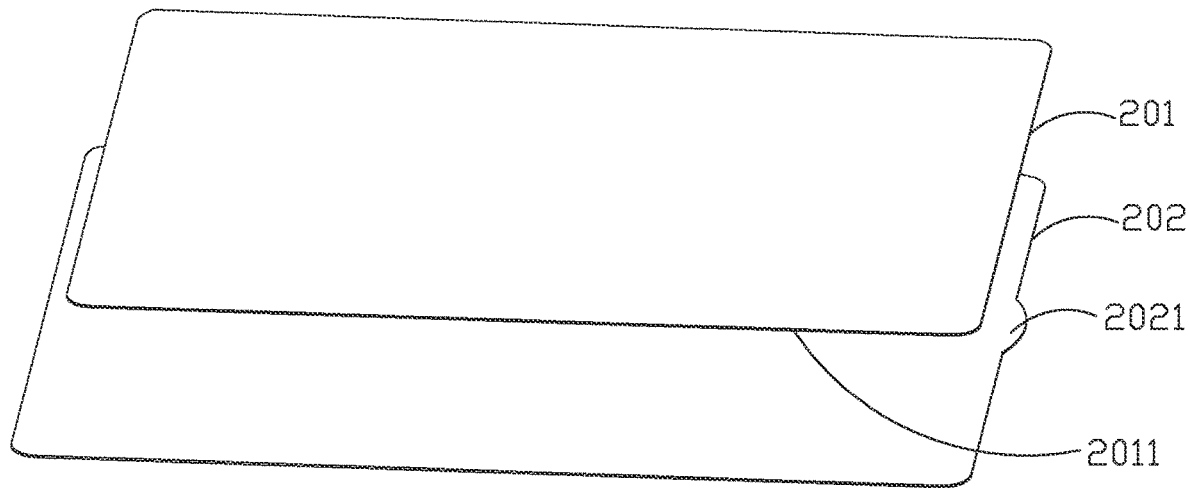
FIG. 1 is an exploded view of a sticking film according to a first embodiment of the present disclosure.
Figure 2:
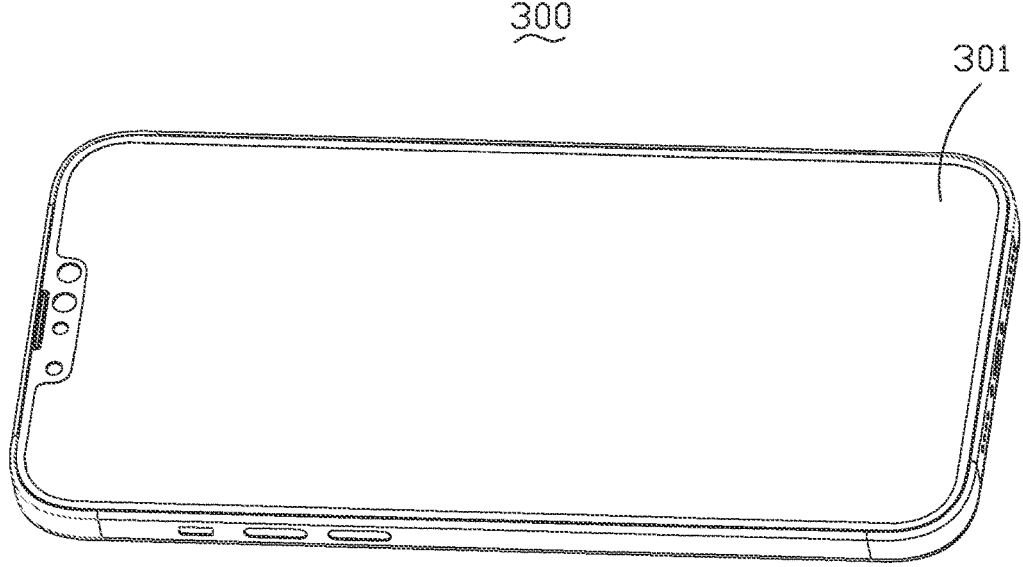
FIG. 2 is a perspective view of an electronic product according to the present disclosure.

NUMERICAL REFERENCE IDENTIFICATION 200. sticking film; 201. tempered film; 2011. sticking surface; 2012. first end; 2013. second end; 202. release film layer; 2021. tip; 2022. end; 2023. connecting end; 240. protective layer; 300. electronic product; 301. screen; 400. sticking film; 440. protective layer; 441. covering portion; 442. positioning portion; 443. positioning member; 500. film-sticking tool; 501. base; 5011. first wall; 5012. second wall; 5013. side wall; 5014. fixing member; 502. positioning slot; 100. sticking film; 121. sticking portion; 122. connecting section; 1221. first connecting section; 1222. second connecting section; 125. folding line; 130. pulling portion; 133. storage folding line; 600. film-sticking tool; 601. base; 602. positioning slot; 6011. first wall; 6012. second wall; 6013. side wall; 6014. fixing member; 6015. supporting edge; 6016. pulling opening; 700. film-sticking tool; 701. base; 7014. fixing member; 703. upper cover; 706. lower cover; 7016. pulling opening; 800. film-sticking assembly.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not for the purpose of limiting the disclosure.

It should be noted that, in the present disclosure, the terms "up", "down", "left", "right", "front", "rear", "top", "bottom", "inside", "outside", "middle", "vertical", "horizontal", "longitudinal", etc. are based on the orientations or positional relationships shown in the drawings. Terms herein are primarily used to better describe the disclosure and the embodiments, and are not intended to limit that the indicated device, element, or component must have a particular orientation, or be constructed and operated in a particular orientation.

In addition, some of the above-mentioned terms may be used to express other meanings besides orientation or positional relationship. For example, the term "on" may also be used to express a certain attachment or connection relationship in some cases. For those skilled in the art, the specific meanings of the above terms in the present disclosure can be understood according to specific situations.

Furthermore, the terms "install", "arrange", "provide", "connect", "contact" should be construed broadly. For example, it may be a fixed connection, a detachable connection, or an integral structure; it may be a mechanical connection, or an electrical connection; it may be directly connected, or indirectly connected through an intermediary, or an internal communication between two devices, elements, or components. For those skilled in the art, the specific meanings of the above terms in the present disclosure can be understood according to specific situations.

Referring to FIG. 1, a first embodiment of the present disclosure provides a sticking film 200, which includes a tempered film 201 and a release film layer 202 attached to the tempered film 201. The tempered film 201 is used to be attached to a screen 301 of an electronic product 300, and the release film layer 202 is an electrostatic layer. Optionally, the tempered film 201 is provided with a sticking surface 2011 attached to the release film layer 202. After tearing off the release film layer 202, the sticking surface 2011 is attached to the screen 301 of the electronic product 300. When pasting, the release film layer 202 and the tempered film 201 are separated, and the side of the release film layer 202 that is attached to the tempered film 201 generates static electricity. The side of the release film layer 202 with static electricity is placed close to the screen 301 of the electronic product 300 to attract dust on the screen.

Referring to FIG. 1 again, the release film layer 202 is provided with a tip 2021 to facilitate tearing off the release film layer 202.

Figure 3:
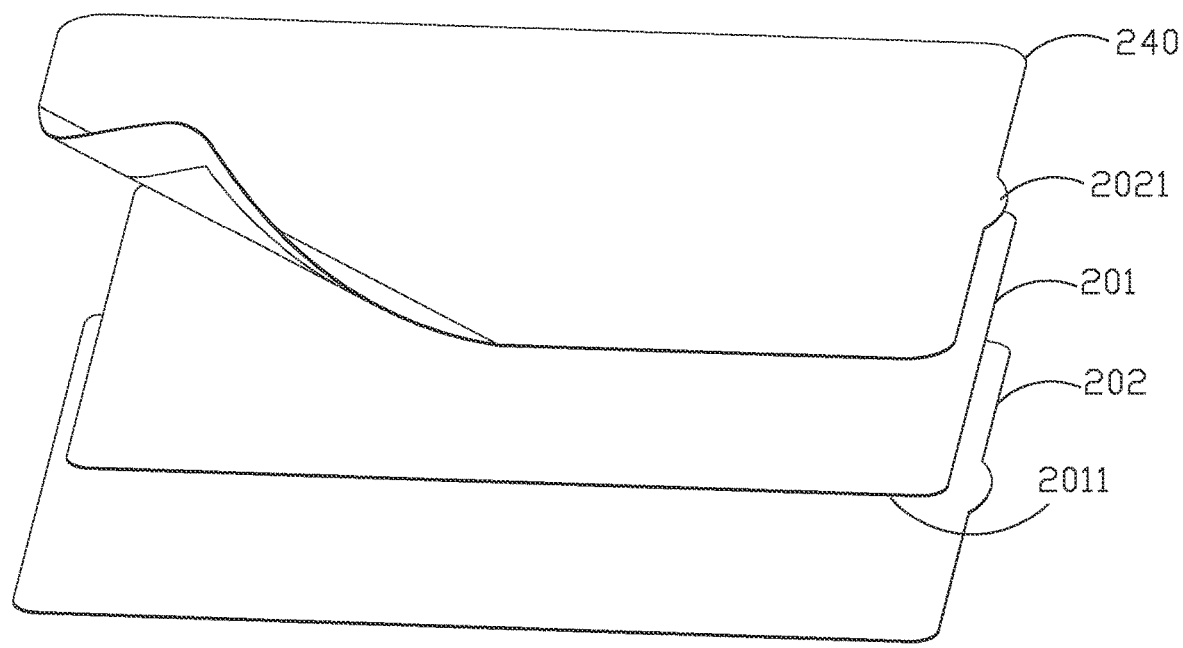
FIG. 3 is an exploded view of the sticking film according to a second embodiment of the present disclosure.

Referring to FIG. 3, the sticking film 200 further includes a protective layer 240 disposed on the side of the tempered film 201 away from the sticking surface 2011. Similarly, the tip 2021 is also provided on the protective layer 240 to facilitate tearing off the protective layer 240.

In some specific embodiments, the release film layer 202 is made of a material that is easy to generate static electricity by friction, so that static electricity is generated when the release film layer 202 and the tempered film 201 are separated. Optionally, the release film layer 202 is made of synthetic-resin-based material, rubber-based material or the like. Optionally, the synthetic-resin-based material includes PET (polyethylene terephthalate), PE (polyethylene), PC (polycarbonate) or PVC (polyvinyl chloride). The rubber-based material includes SBR (styrene butadiene rubber), NBR (nitrile butadiene rubber), or some BR (butadiene rubber). As an option, in this embodiment, PET is selected as the material for preparing the release film layer 202. The PET material has a wide source, low cost, and excellent material performance. The release film layer 202 can be prepared to have different hardnesses according to requirements, so as to prepare different types of the sticking film 200.

The tempered film 201 has an impact-resisting function, and is mainly obtained by tempering a glass sample made of some silicate material. The main material and preparation process thereof are prior art, which will not be repeated here.

In other embodiments, the sticking surface 2011 of the tempered film 201 prepared based on a general process usually includes some glue, such as AB glue, OCA glue or some other polymerized organic compound. Therefore, some of the tempered films 201 are easily with static electricity when separated from the release film layer 202, which will easily cause the tempered film 201 to generate static electricity and attract dust when the release film layer 202 is separated. When preparing the tempered film 201, some antistatic materials are added to make the tempered film 201 have antistatic properties, so that when the release film layer 202 is torn off from the tempered film 201, the tempered film 201 will not generate static electricity, which avoids attracting dust and improves the cleanliness of the tempered film 201.

It should be noted that the sticking film 200 of this embodiment can also complete the pasting without the assistance of a sticking tool.

The pasting process of the sticking film 200 will be described below. An optional film pasting process includes steps of:

S1, placing the electronic product 300 to be attached with the tempered film 201 on the desktop;

S2, tearing off the release film layer 202 from the tempered film 201 through the tip 2021, and placing the side of the torn release film layer 202 that is attached to the sticking surface 2011 close to the screen 301 or in contact with the screen 301 to attract the dust on the screen 301; and S3, aligning the tempered film 201 with the screen 301 of the electronic product 300, contacting one end of the tempered film 201 with the screen 301 first, and then gradually contacting the tempered film 201 with the remaining area of the screen 301 from the first-contact end, so that the direction of the pasting is relatively single, which is beneficial to remove air bubbles.

Figure 4:
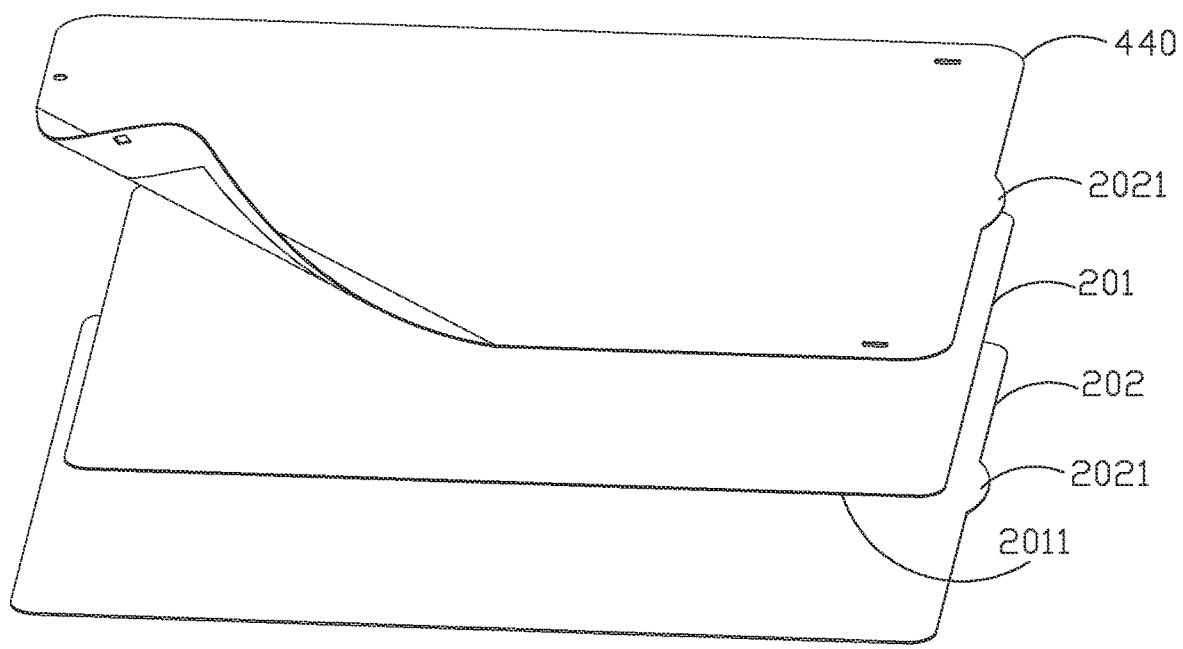
FIG. 4 is another exploded view of the sticking film according to the second embodiment of the present disclosure.
Figure 5:
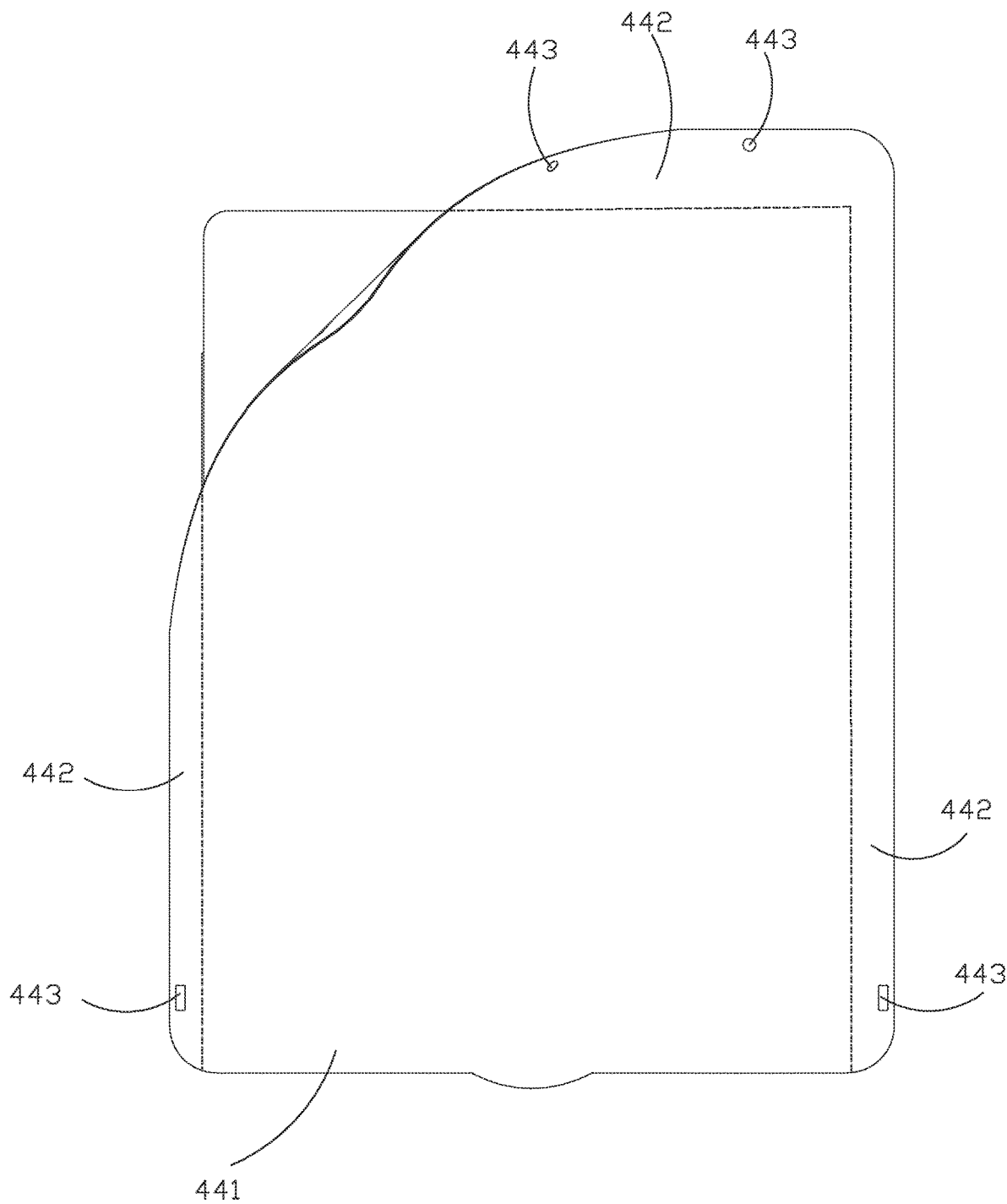
FIG. 5 is another exploded view of partial of the sticking film according to the second embodiment of the present disclosure.
Figure 6:
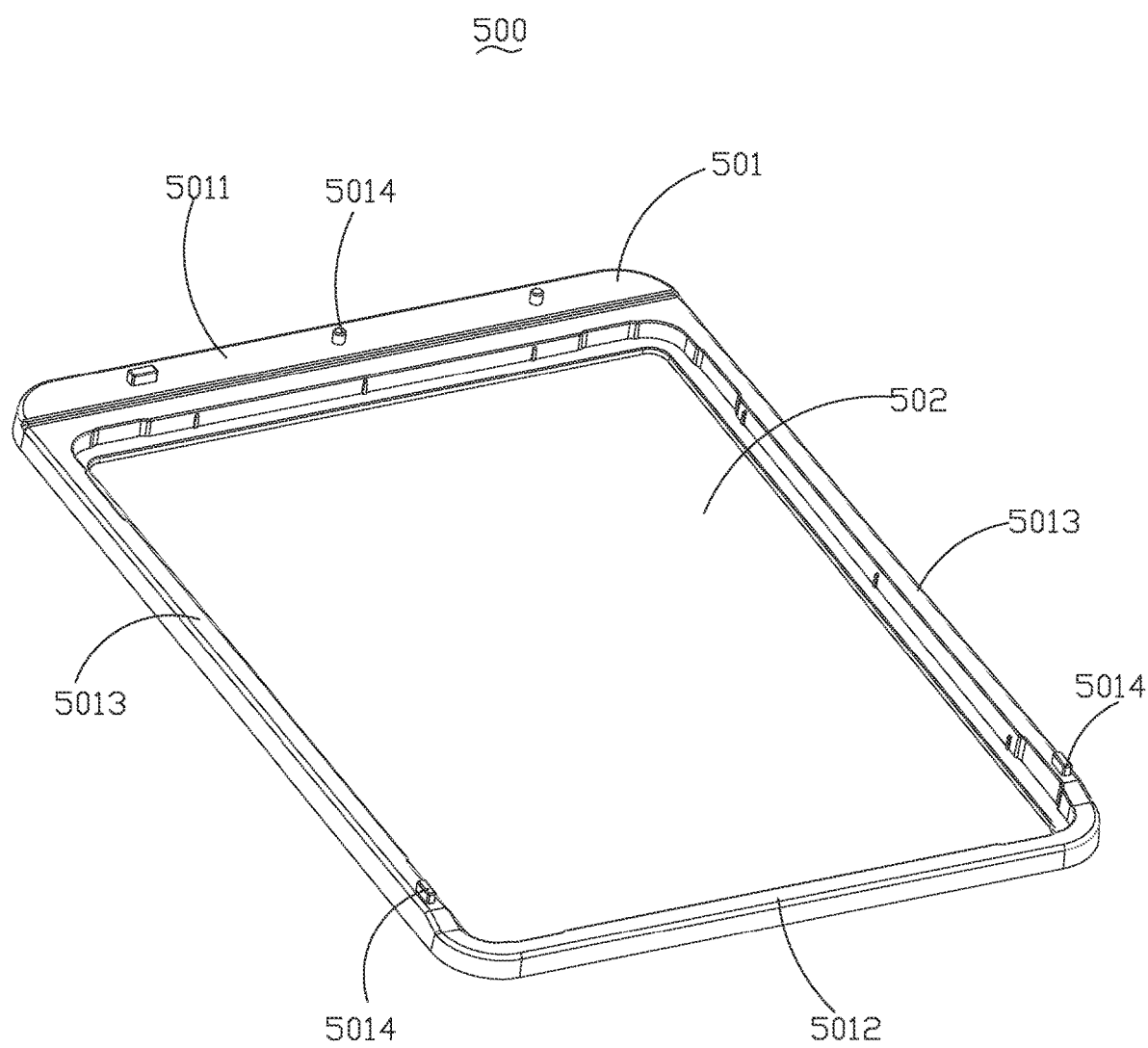
FIG. 6 is a perspective view of an film-sticking tool according to the present disclosure.

Referring to FIG. 4, FIG. 5 and FIG. 6, a second embodiment of the present disclosure provides a sticking film 400, which is different from the sticking film 200 of the first embodiment in that the protective layer 440 includes a covering portion 441 covering the tempered film 201, and a positioning portion 442 extending beyond the covering portion 441. The positioning portion 442 is provided with a positioning member 443, which is used to cooperate with the film-sticking tool 500 to position the sticking film 400.

In some specific embodiments, the positioning member 443 is a through-hole or a pillar.

Referring to FIG. 6 again, the film-sticking tool 500 includes a base 501, which is provided with a positioning slot 502 for accommodating the electronic product 300 to be pasted. The base 501 has a first wall 5011 and a second wall 5012 that are oppositely arranged, and the first wall 5011, the second wall 5012 and two side walls 5013 enclose together to form the positioning slot 502.

The base 501 is provided with a fixing member 5014, which is disposed on the first wall 5011 and the side wall 5013. When the positioning member 443 is a through-hole, the fixing member 5014 is a pillar. When the positioning member 443 is a pillar, the fixing member 5014 is a structure of a through hole, a blind hole or a counterbore.

After placing the electronic product 300 into the positioning slot 502 and positioning the sticking film 400 on the film-sticking tool 500, there is a certain distance between the tempered film 201 and the screen 301 of the electronic product 300, so that the tempered film 201 is attached to the screen 301 of the electronic product 300 from one end to the other end by further pressing force.

An optional film pasting process includes steps of:

T1, placing the electronic product 300 to be attached with the tempered film 201 into the positioning slot 502;

T2, tearing off the release film layer 202 from the tempered film 201 through the tip 2021, placing the side of the torn release film layer 202 that is attached to the sticking surface 2011 close to the screen 301 or in contact with the screen 301, attracting the dust on the screen 301, positioning the sticking film 400 on the film-sticking tool 500, and at the same time making the sticking surface 2011 align with the screen 301 and be close to the screen 301; and T3, contacting the tempered film 201 with the screen 301 by pressing one end of the surface of the protective layer 440 to make one end of the tempered film 201 be in contact with the screen 301 first, and then gradually contacting the tempered film 201 with the remaining area of the screen 301 from the first-contact end, so that the direction of the film pasting is fixed, which is beneficial to remove air bubbles.

Figure 7:
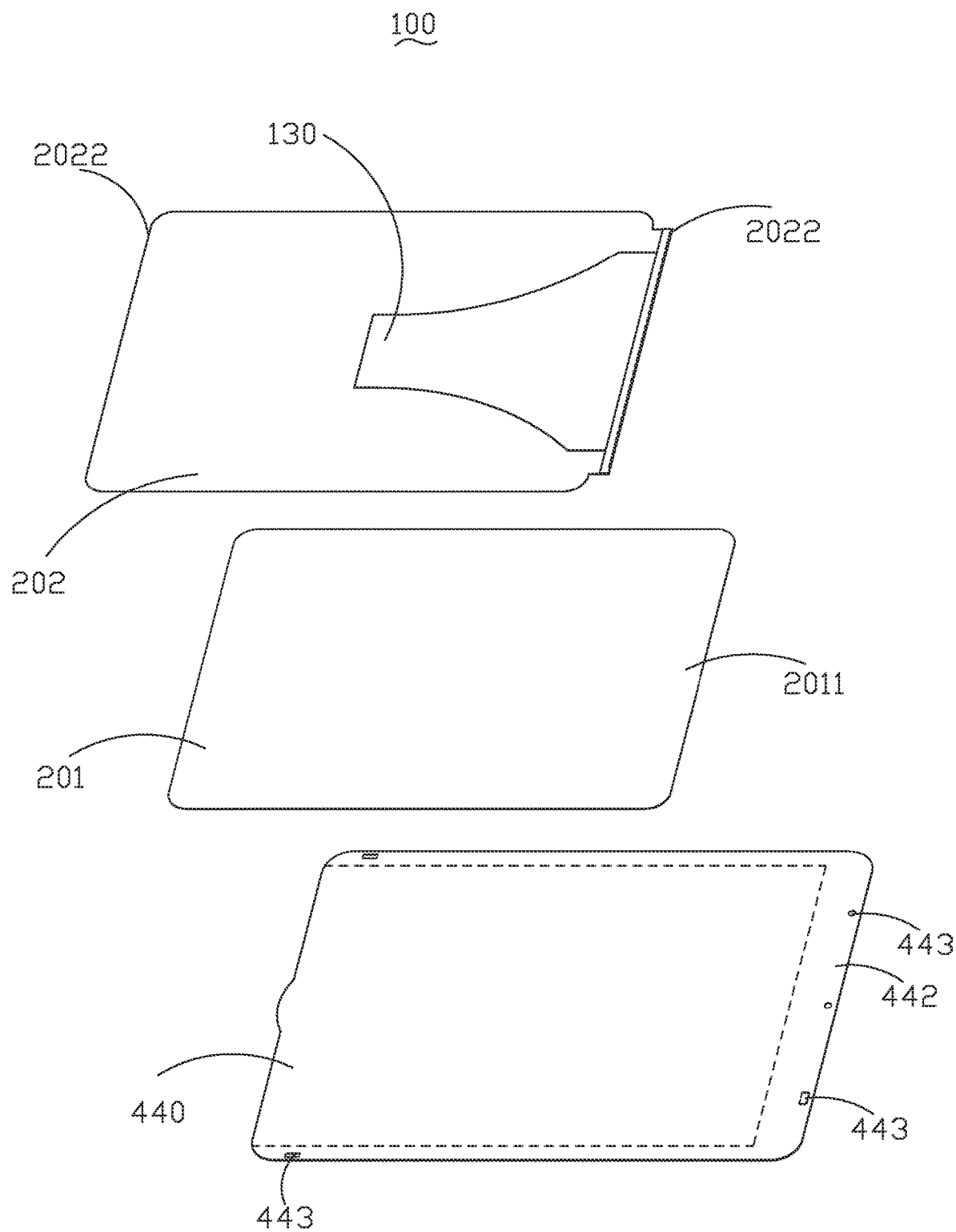
FIG. 7 is an exploded view of the sticking film according to a third embodiment of the present disclosure.
Figure 8:
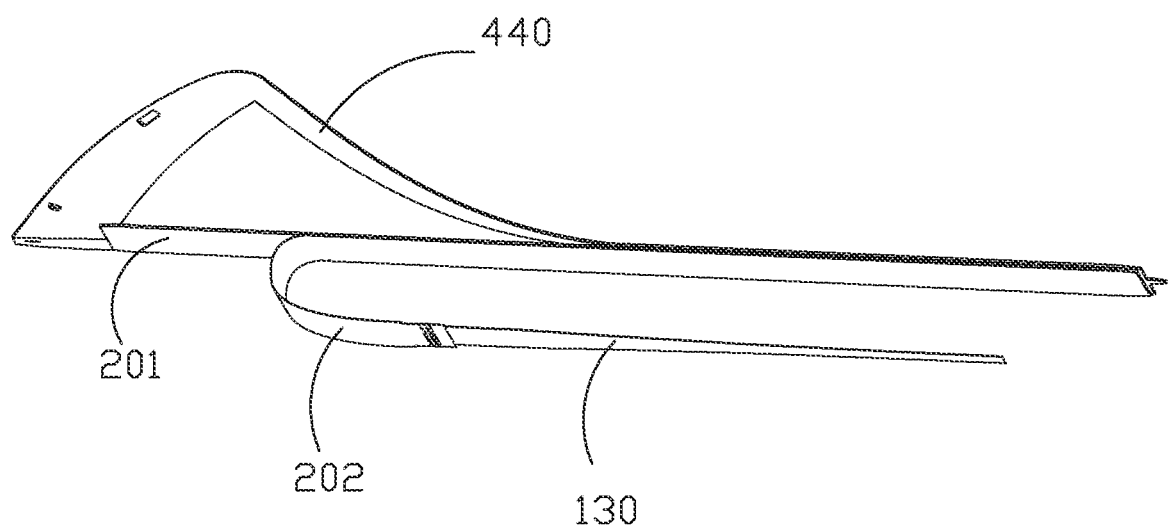
FIG. 8 is another exploded view of the sticking film according to the third embodiment of the present disclosure.

Referring to FIG. 7 and FIG. 8, a third embodiment of the present disclosure provides a sticking film 100, which is mainly different from the sticking film 200 of the first embodiment or the sticking film 400 of the second embodiment in that the sticking film 100 further includes a pulling portion 130 disposed on the release film layer 202, instead of the tip on the release film layer 202, and the release film layer 202 is torn off through the pulling portion 130. The release film layer 202 has two end portions 2022 in the longitudinal direction. The pulling portion 130 is connected to one end portion 2022 of the release film layer 202, and part or all of the pulling portion 130 is positioned at the side of the release film layer 202 away from the sticking surface 2011. The pulling portion 130 extends for a certain length along the longitudinal direction of the release film layer 202. Thus, it is easier for the operator to apply force and convenient to tear off the release film layer 202, and the tempered film 201 will not be polluted due to fingers touching the tempered film layer 201 when the release film layer 202 is torn off. At the same time, the pulling portion 130 is positioned on the release film layer 202 away from the sticking surface 2011 and is pulled toward the free end of the pulling portion 130. At this time, the pulling portion 130 is torn away from the sticking surface 2011 in a folded manner, which can be operated at the top of the screen 301. That is, the release film layer 202 can be torn off by pulling the pulling portion 130, the release film 202 is torn off in a folded manner, and the side generating static electricity of the release film layer 202 can be in contact with the screen 301 naturally, so that the dust can be taken away simultaneously, and the use of static electricity can be maximized When the release film layer 202 is torn off, the release film layer 202 is positioned between the tempered film 201 and the screen 301 in a curved shape.

In some other embodiments, the pulling portion 130 is connected to one end of the release film layer 202 in the width direction. The pulling portion 130 extends for a certain length along the width direction of the release film layer 202.

As a film-sticking process, when the release film layer 202 is torn off, the sticking surface 2011 of the release film layer 202 is in pressing contact with the screen 301. In this case, during the process of tearing off the release film layer 202, the release film layer 202 is in contact with the screen 301 and there is friction, so that the release film layer 202 further generates static electricity, and the dust on the screen 301 can be attracted better.

Optionally, the release film layer 202 and the pulling portion 130 are integrally formed or separately arranged. When arranged separately, the release film layer 202 and the pulling portion 130 are required to be connected by means of pasting, clamping, or the like.

Figure 9:
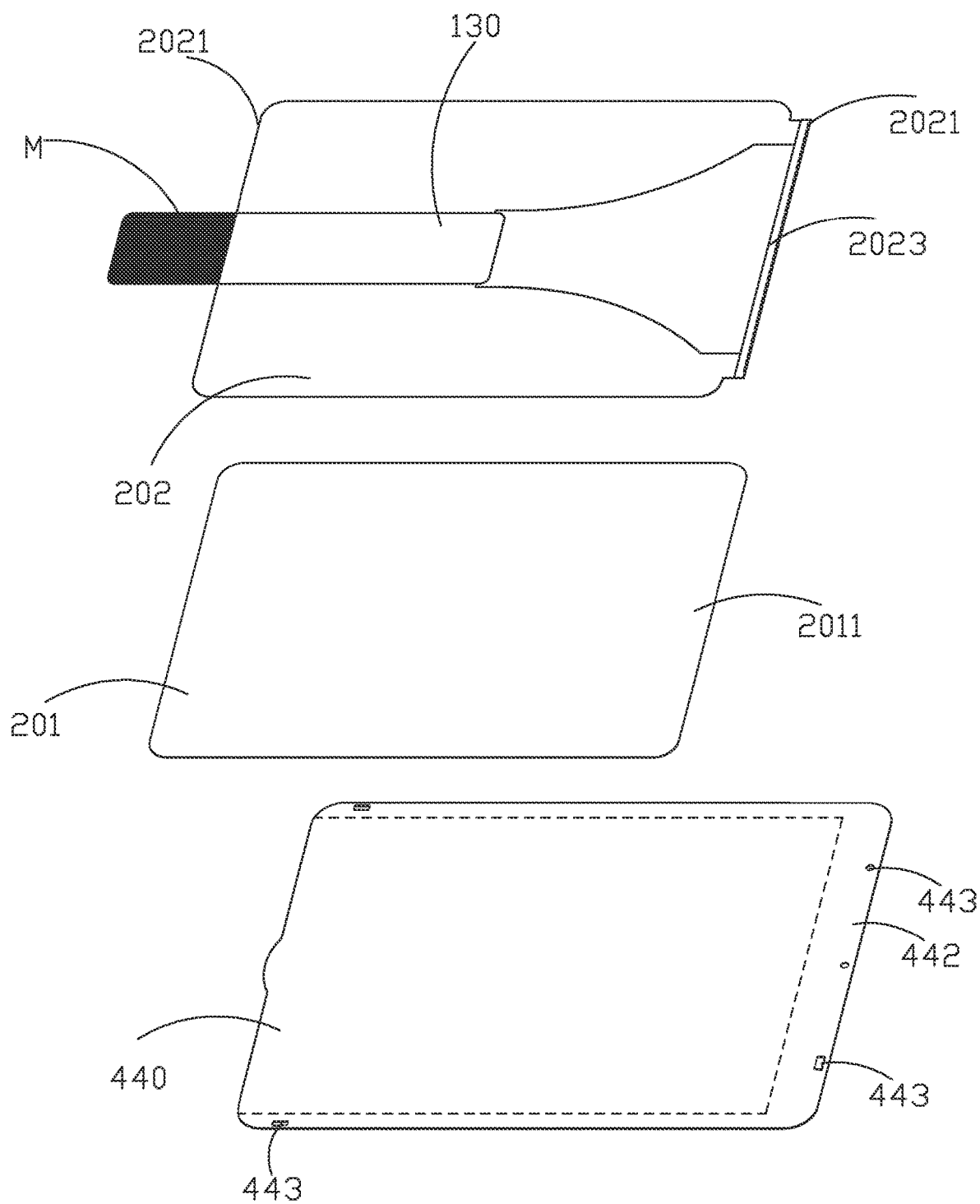
FIG. 9 is an exploded view of another sticking film according to the third embodiment of the present disclosure.
Figure 10:
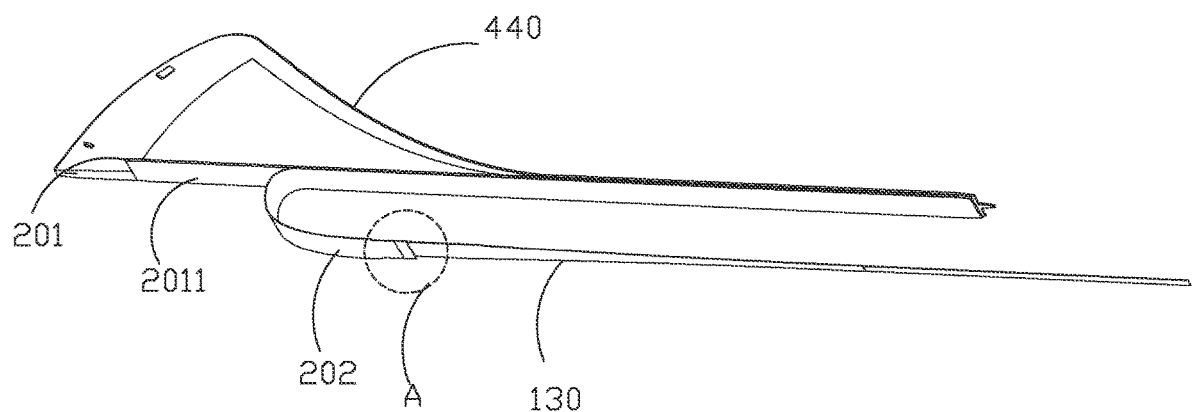
FIG. 10 is another exploded view of another sticking film according to the third embodiment of the present disclosure.
Figure 11:
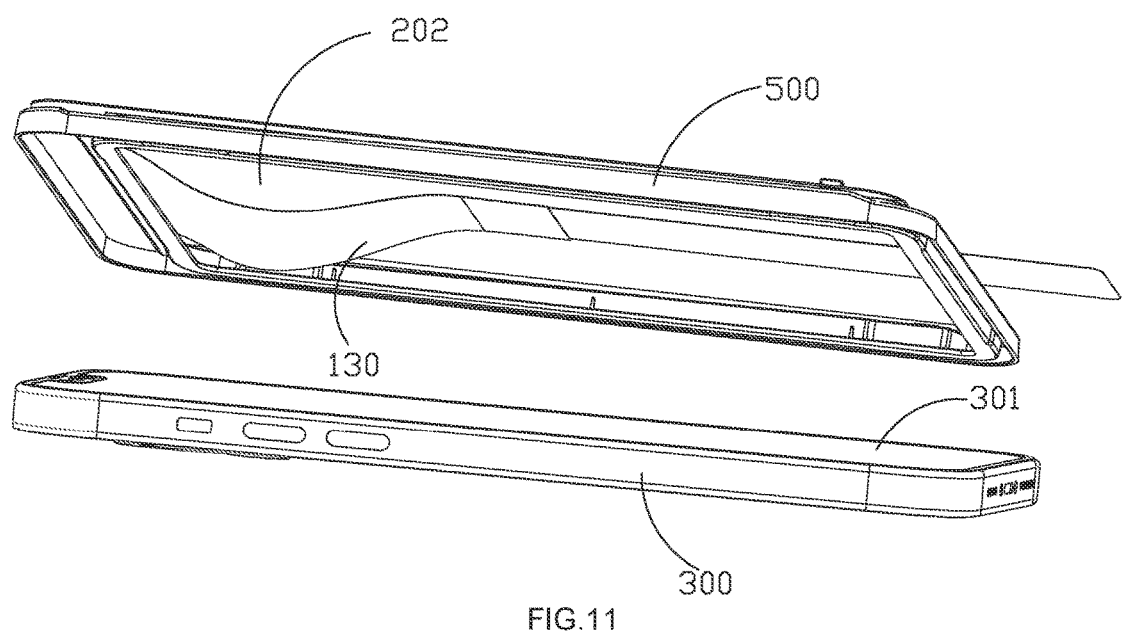
FIG. 11 is an exploded view of a state where another sticking film according to the third embodiment of the present disclosure is opposite to the electronic product.

Referring to FIG. 9, FIG. 10 and FIG. 11, in a variant embodiment, the end of the pulling portion 130 connected with the release film layer 202 is defined as a connecting end 2023. When the pulling portion 130 is connected to the connecting end 2023 of the release film layer 202 in the longitudinal direction, the extension length of the pulling portion 130 along the longitudinal direction is greater than the length dimension of the release film layer 202. After the pulling portion 130 is formed on the release film layer 202, there is a portion of the pulling portion 130 extending beyond the end portion 2021 of the release film layer 202 opposite to the connecting end 2023, as the M portion shown in FIG. 9. When the pulling portion 130 is connected to the connecting end of the release film layer 202 in the width direction, the extension length of the pulling portion 130 along the width direction is greater than the width dimension of the release film layer 202. After the pulling portion 130 is formed on the release film layer 202, there is a portion of the pulling portion 130 extending beyond the width end of the release film layer 202 opposite to the connecting end.

When the sticking film 100 is positioned on the film-sticking tool 500, the pulling portion 130 is positioned between the release film layer 202 and the screen 301, and there is a space between the release film layer 202 and the screen 301. When the M portion is pulled, the release film layer 202 and the tempered film 201 are separated, so that static electricity is generated to attract dust. By configuring the M portion extending beyond the release film layer 202, after the electronic product 300 is placed on the film-sticking tool 500, there is a portion of the pulling portion 130 that extending beyond the film-sticking tool 500. That is, the release film layer 202 can be torn off after placing the electronic product 300, so that the time interval between tearing off the release film layer 202 and attaching the tempered film 201 to the screen is shorter, the operation steps are more consistent, and the time in contact with the air is shortened. The process of tearing off and pasting film is almost at the same time, which avoids attracting too much dust and improves the effect of the film sticking. During the process of tearing off the release film layer 202, the release film layer 202 generates static electricity to attract the dust on the screen 301. That is, the release film layer 202 is torn off in a folded manner by pulling the pulling portion 130, so that the side generating static electricity of the release film layer 202 can be in contact with the screen 301 naturally to attract the dust on the screen 301.

Several ways to attract dust during the attaching process of the sticking film 100 are as follows.

Way 1 is that during the process of tearing off the release film layer 202, the release film layer 202 is close to instead of in contact with the screen 301, and the static electricity is used to attract dust. In this case, after the release film layer 202 is torn off, the tempered film 201 will directly face the screen 301, and the dust on the screen 301 will easily fly to the sticking surface of the tempered film 201. In order to prevent the tempered film 201 from attracting dust, it is necessary to configure the tempered film 201 as an antistatic layer.

Way 2 is that during the process of tearing off the release film layer 202, the release film layer 202 is curled between the screen 301 and the sticking surface 2011 of the tempered film 201, and the release film layer 202 falls on the screen 301 and contacts the screen 301. In this case, when torn off, the release film layer 202 first contacts the screen 301 to attract the dust, so as to prevent the dust from being adsorbed on the tempered film 201. At the same time, the release film layer 202 is in contact with the screen 301, which can well prevent the dust on the area of the screen 301 not covered by the torn release film layer 202 from flying up under the electrostatic attraction of the tempered film 201 and the release film layer 202, resulting in the tempered film 201 also attracting dust. The tempered film 201 can be an antistatic layer or a non-antistatic layer.

Figure 12:
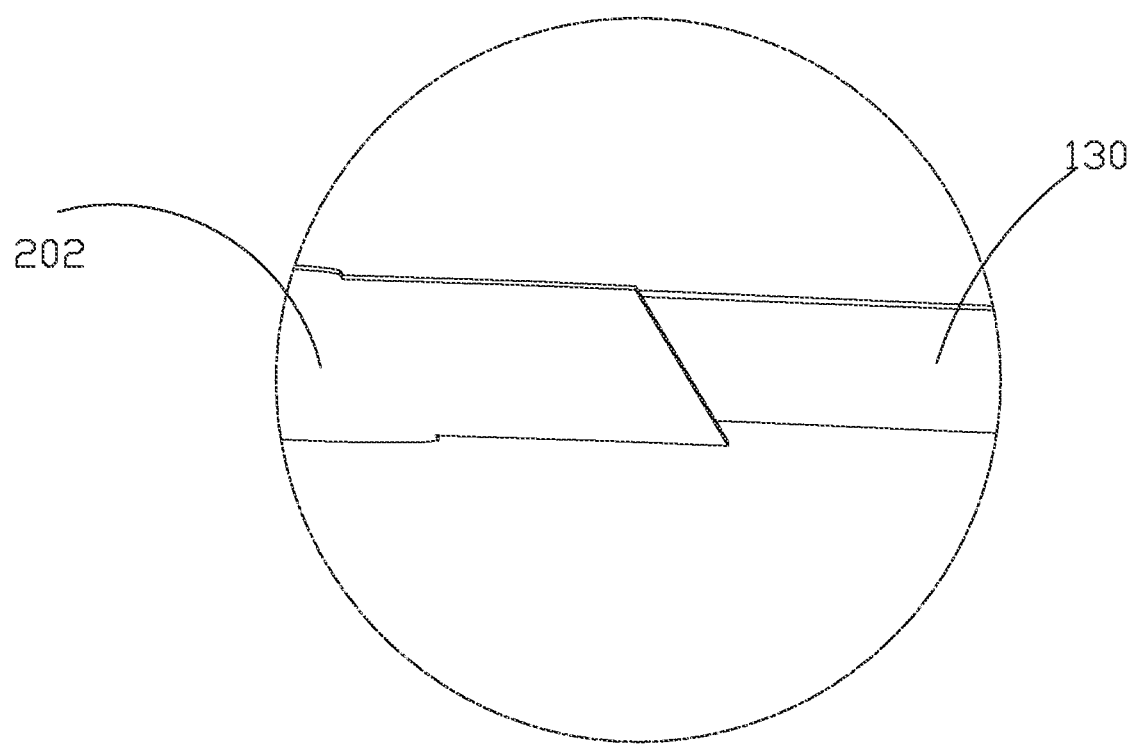
FIG. 12 is an enlargement view of part A of FIG. 10.

Referring to FIG. 10 and FIG. 12, the pulling portion 130 and the release film layer 202 are arranged separately, and the pulling portion 130 is connected to the side of the release film layer 202 away from the sticking surface 2011. The end of the release film layer 202 and the pulling portion 130 are superimposed to form a step, and the step contacts the screen 301 to remove dust when pulling the pulling portion 130. By forming a step structure similar to the structure of a scraper, part of the dust, especially the larger size dust, can be scraped away first, and then combined with electrostatic attraction to achieve a better dust removal effect.

Figure 13:
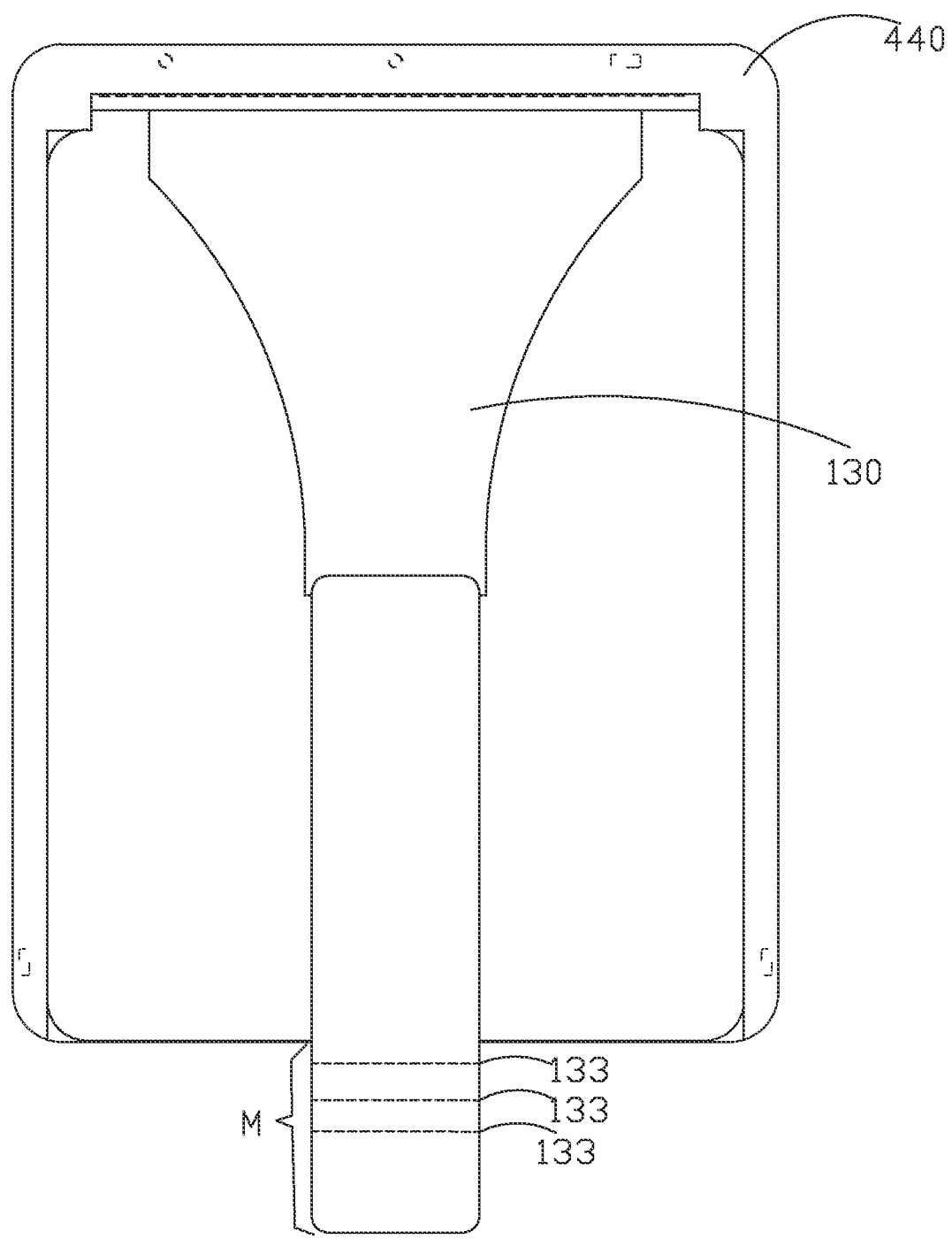
FIG. 13 is a plan view of another sticking film according to the third embodiment of the present disclosure.
Figure 14:
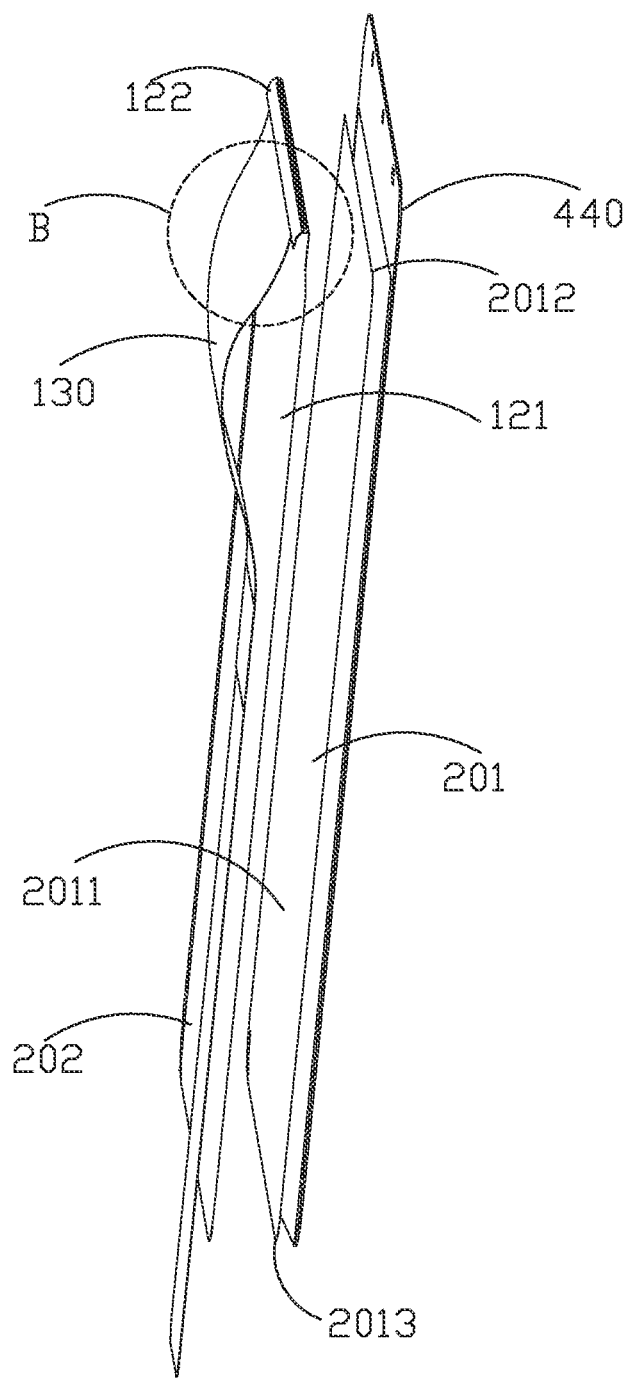
FIG. 14 is an exploded view of another sticking film from another angle according to the third embodiment of the present disclosure.
Figure 15:
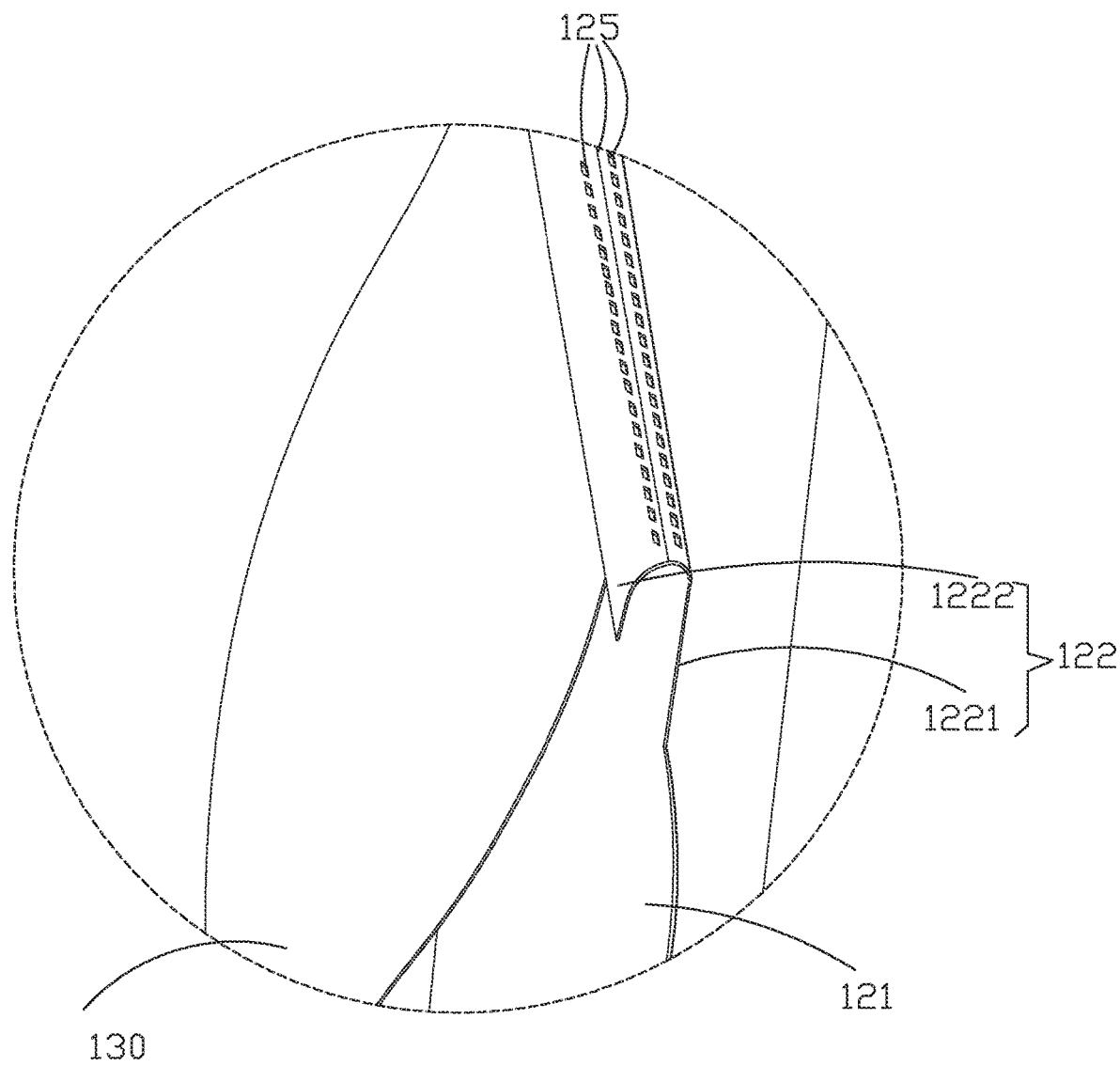
FIG. 15 is an enlargement view of part B of FIG. 14.

Referring to FIG. 13, FIG. 14 and FIG. 15, the tempered film 201 includes a first end 2012 and an opposite second end 2013 in the length direction or the width direction. The release film layer 202 includes a sticking portion 121 covering the sticking surface 2011, and a connecting section 122 extending beyond the first end 2012, and the connecting section 122 is connected to the sticking portion 121. A folding line 125 is provided to divide the connecting section 122 into a first connecting section 1221 and a second connecting section 1222, which are respectively connected to the sticking portion 121 and the pulling portion 130. When the connecting section 122 extends beyond the release film layer 202 in the length direction, the folding line 125 extends along the width direction of the tempered film 201; when the connecting section 122 extends beyond the release film layer 202 in the width direction, the folding line 125 extends along the length direction of the tempered film 201. That is, the extension direction of the folding line 125 is perpendicular to that of the connecting section 122. The first connecting section 1221 and the second connecting section 1222 are folded along the folding line 125 to form the pulling portion 130 on the side of the release film layer 202 away from the sticking surface 2011, which facilitates pulling and tearing off the release film layer 202.

In other embodiments, the release film layer 202 includes a sticking portion 121 covering the sticking surface 2011 and a connecting section 122 extending beyond the second end 2013. That is, the connecting section 122 is disposed on the side close to the second end 2013.

By folding the connecting section 122 along the folding line 125, the pulling portion 130 is positioned on the side of the sticking portion 121 away from the tempered film 201, and the extension of the pulling portion 130 exceeds the second end 2013 of the tempered film 201, so that the pulling portion 130 is more convenient to hold and easy to find, the release film layer 202 can be separated from the tempered film 201 only by pulling the pulling portion 130, and the operation is fast. The pulling portion 130 is pulled in a direction away from the first end 2012 to make the release film layer 202 gradually separate from the tempered film 201 starting from the first end 2012 of the tempered film 201. At the same time, the sticking surface 2011 of the tempered film 201 is attached to the screen 301 of the electronic product 300 to be pasted to complete the sticking operation. The arrangement of the pulling portion 130 makes it simple to separate the release film layer 202 from the tempered film 201, improves the separation rate, and further improves the film-sticking efficiency. It also prevents the user from manually searching for the tear opening of the release film layer 202, causing impurities on the hand to enter the sticking surface 2011 of the tempered film 201, which produces air bubbles between the tempered film 201 and the screen 301, and affects the film-sticking effect.

Referring to FIG. 15 again, the folding line 125 can be formed by a plurality of wire holes or wire grooves arranged at intervals. The shape of the wire hole or wire groove can be linear, square, diamond, oval, etc., and the length direction thereof can be consistent with the width direction or the length direction of the tempered film 201. The shape of the wire hole or wire groove can also be circular, and the folding line 125 can also be formed by a wire groove extending along the width direction of the tempered film 201. The thickness of the wire groove is less than that of the connecting section 122, which can be selected according to actual needs and is not limited here. The arrangement of the folding line 125 makes the first connecting section 1221 and the second connecting section 1222 fit more closely after the connecting section 122 is folded. The space occupied by the connecting section 122 in the thickness direction of the sticking film 100 is reduced, which facilitates pulling the pulling portion 130. In addition, the distance between the tempered film 201 and the screen 301 of the electronic product 300 to be pasted is smaller, and the tempered film 201 can be more easily attached to the screen 301 after the pulling portion 130 is pulled.

Referring to FIG. 13 and FIG. 14 again, the pulling portion 130 is provided with a plurality of storage folding lines 133 that extend along the width direction of the pulling portion 130. The storage folding lines 133 are arranged at the M portion of the pulling portion 130 beyond the tempered film 201, and arranged at intervals in the longitudinal direction of the pulling portion 130. The storage folding line 133 is formed by a plurality of wire holes arranged at intervals, or formed by at least one wire groove. In this embodiment, the extension of the pulling portion 130 extends beyond the second end 2013 to facilitate holding and searching. However, the part beyond the tempered film 201 is inconvenient for the sticking film 100 to be stored and packaged before being sold. Therefore, a storage folding line 133 is provided on the pulling portion 130 to facilitate folding the part of the pulling portion 130 of the folded sticking film 100 beyond the second end 2013 of the tempered film 201 toward the first end 2012. Specifically, the storage folding line 133 may be formed by a plurality of wire holes or wire grooves arranged at intervals. The shape of the wire hole or wire groove can be linear, square, diamond, oval or the like, and the length direction thereof can be consistent with the width direction or the length direction of the tempered film 201. The shape of the wire hole or wire groove may also be circular. The storage folding line 133 can also be formed by a wire groove extending along the width direction of the tempered film 201, and the thickness of the wire groove is less than that of the connecting section 122, which can be selected according to actual needs and is not limited here.

For the sticking film 100, an optional film-sticking process includes steps of:

P1, placing the electronic product 300 to be attached with the tempered film 201 into the positioning slot 502;

P2, positioning the sticking film 100 on the film-sticking tool 500, positioning the pulling portion 130 between the screen 301 and the release film layer 202, tearing off the release film layer 202 from the tempered film 201 by pulling the M portion of the pulling portion 130, placing the side of the torn release film layer 202 that is attached to the sticking surface 2011 close to or in contact with the screen 301 to attract the dust on the screen 301; and P3, pressing one end of the surface of the protective layer 440 to make one end of the screen 301 first contact the tempered film 201, then gradually contacting the tempered film 201 with the remaining area of the screen 301 from the first-contact end, so that the direction of the film pasting is fixed, which is beneficial to remove air bubbles.

Figure 16:
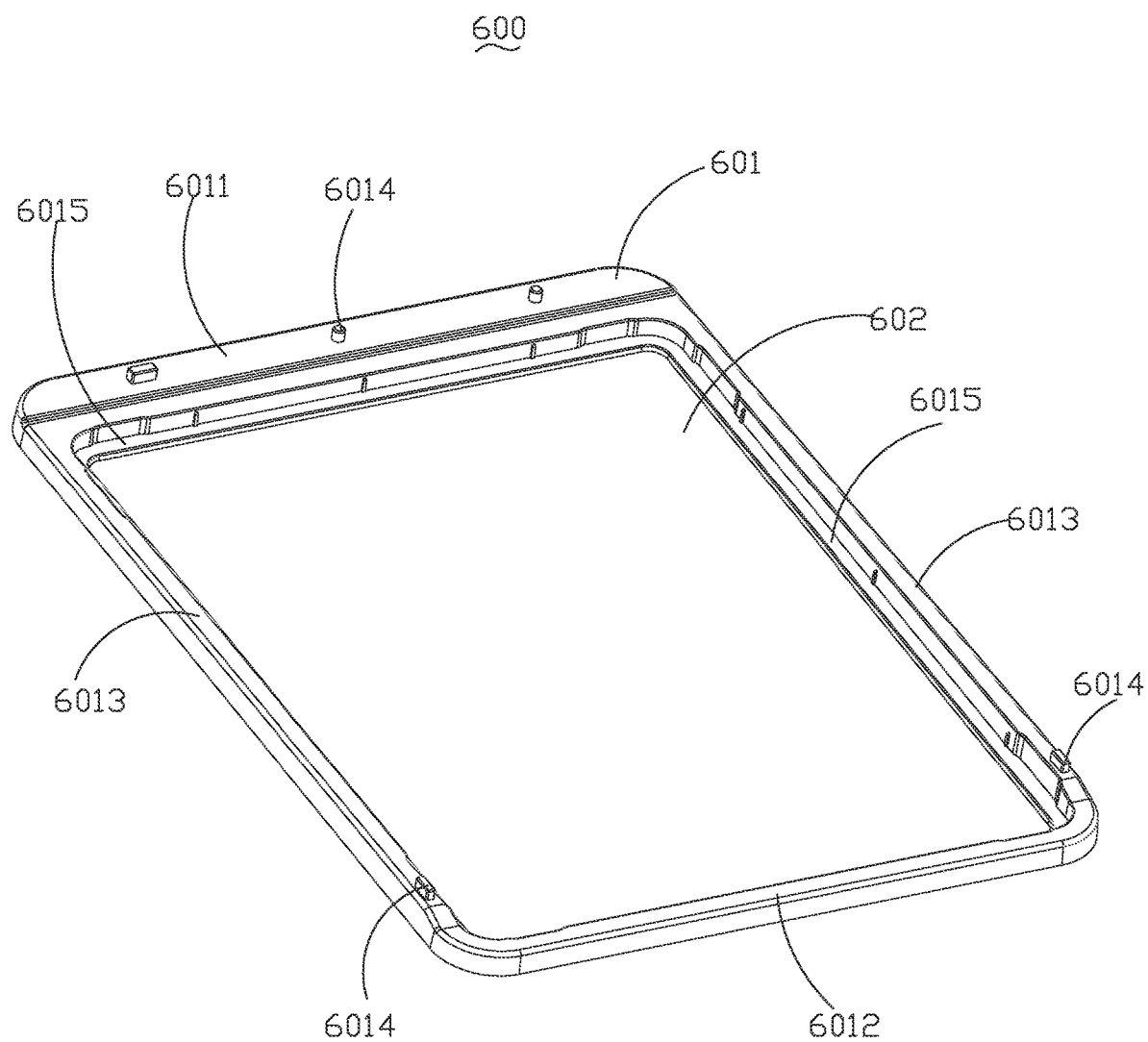
FIG. 16 is a perspective view of the film-sticking tool according to a fourth embodiment of the present disclosure.
Figure 17:
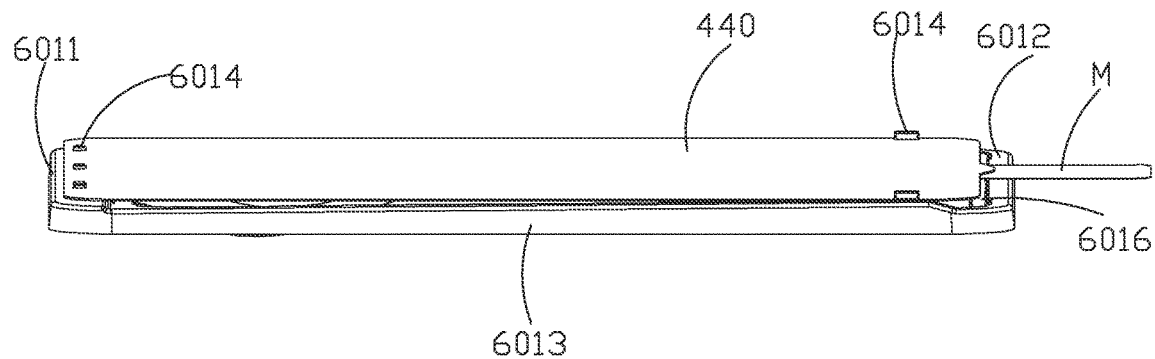
FIG. 17 is a perspective view of the sticking film matching with the film-sticking tool according to the fourth embodiment of the present disclosure.
Figure 18:
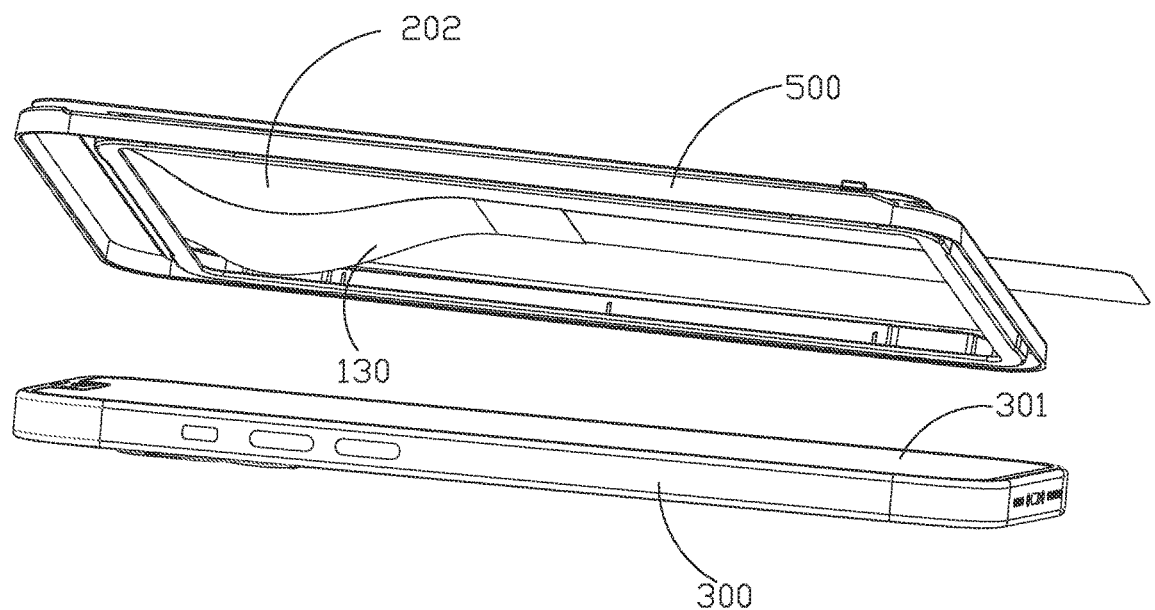
FIG. 18 is an exploded view of a state when the sticking film matching with the film-sticking tool according to the fourth embodiment of the present disclosure is opposite to the electronic product.

Referring to FIG. 16, FIG. 17 and FIG. 18, a fourth embodiment of the present disclosure provides a film-sticking tool 600 for cooperating with the sticking films described in the first, second and third embodiments to attach the tempered film to the screen 301 of the electronic product 300.

The film-sticking tool 600 includes a base 601, which is provided with a positioning slot 602 for accommodating the electronic product 300 to be filmed. The base 601 is provided with a first wall 6011 and a second wall 6012 arranged oppositely, and two side walls 6013 disposed between the first wall 6011 and the second wall 6012. The first wall 6011, the second wall 6012 and the two side walls 6013 enclose to define the positioning slot 602. A supporting edge 6015 is provided at the corresponding positions of the first wall 6011, the second wall 6012 and the side wall 6013. When the electronic product 300 is placed into the positioning slot 602, the supporting edge 6015 supports and lifts the electronic product 300.

When the electronic product 300 is placed in the positioning slot 602 and the sticking film 400 is positioned on the film-sticking tool 600, there is a certain distance between the tempered film and the screen 301 of the electronic product.

In order to facilitate the pulling and tearing of the release film layer 202 through the pulling portion 130, the film-sticking tool 600 is provided with a pulling opening 6016 through which the pulling portion 130 extends. As shown in FIG. 17, in order to form the pulling opening 6016, a transition slope can be provided between the side wall 6013 and the second wall 6012, so that the height of the second wall 6012 is lower than that of the side wall 6013 to form the pulling opening 6016. Optionally, the pulling opening 6016 may also be formed in other ways, for example, by opening a through-hole on the second wall 6012 to form the pulling opening 6016.

Referring to FIG. 17, the base 601 is provided with a fixing member 6014 for positioning the sticking film. The side wall 6013 is configured in a state in which one end in the longitudinal direction is high and the other end therein is low along the extending direction, that is, an inclined state, so that after positioning the sticking film on the film-sticking tool 600 and placing the electronic product 300 in the positioning slot 602, there is a height difference between the height of the first end 2012 of the tempered film 201 relative to the screen 301 and the height of the second end 2013 of the tempered film 201 relative to the screen 301. Thus, during the process of film sticking, the tempered film at the end with the smaller height difference from the screen is attached to the screen first, and then the tempered film is gradually squeezed along the end with the smaller height difference, so that the direction of the film pasting is fixed, which is further beneficial to remove air bubbles.

Optionally, the height difference between the tempered film and the screen may also be configured by other means, for example, the support edge 6015 can be configured to have a structure with a height difference.

It should be noted that configuring the height difference is not the only way. A better film-sticking effect can also be achieved by canceling the height difference to make the height of the first end and the second end consistent to control the process of film sticking from one end to the other end. For example, the direction of the film sticking starts from the end away from the pulling opening 6016, and then gradually attaches toward the end of the pulling opening 6016.

Figure 19:
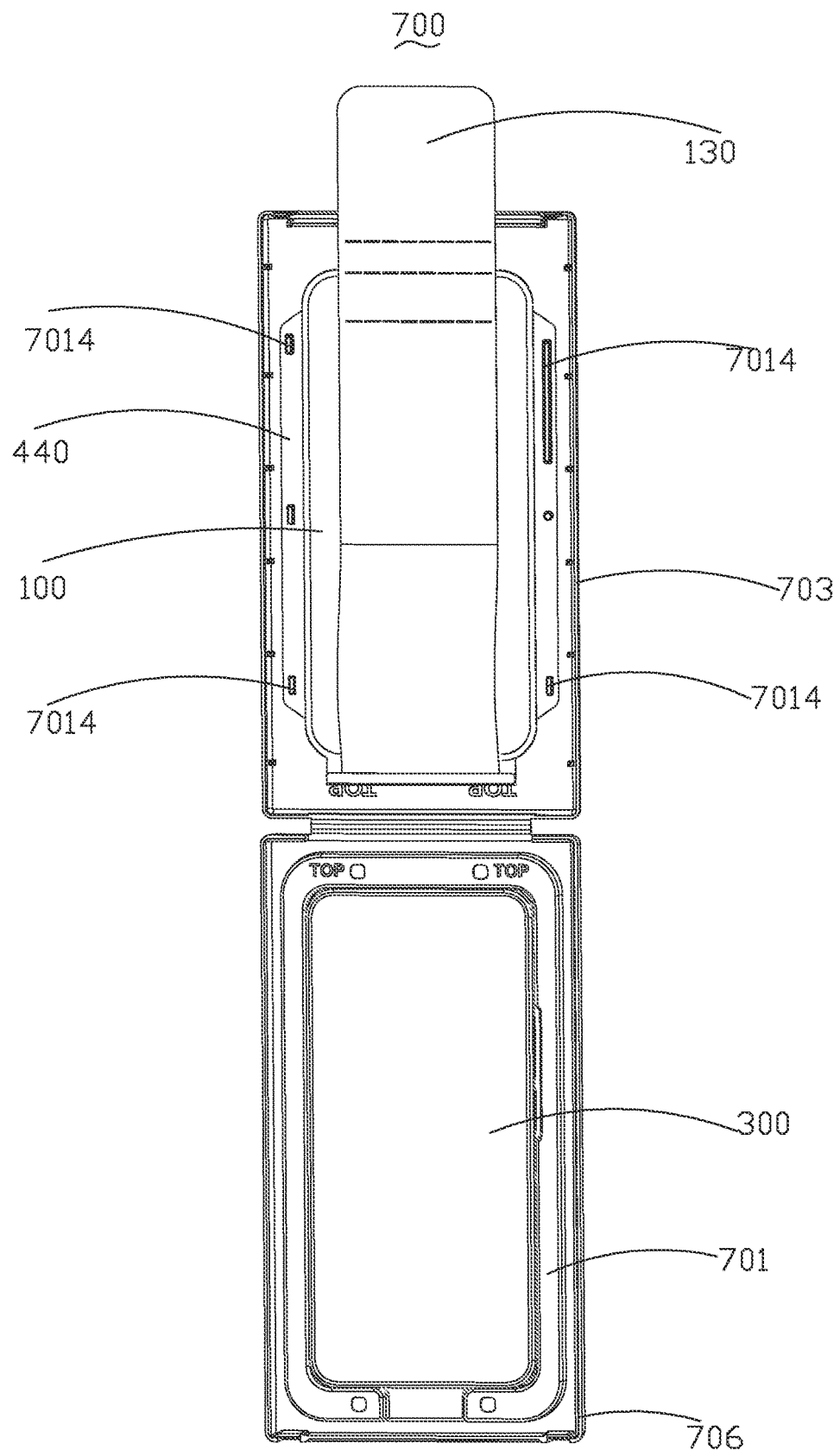
FIG. 19 is a schematic diagram of another film-sticking tool according to the fourth embodiment of the present disclosure in an open state after being matched with the sticking film.
Figure 20:
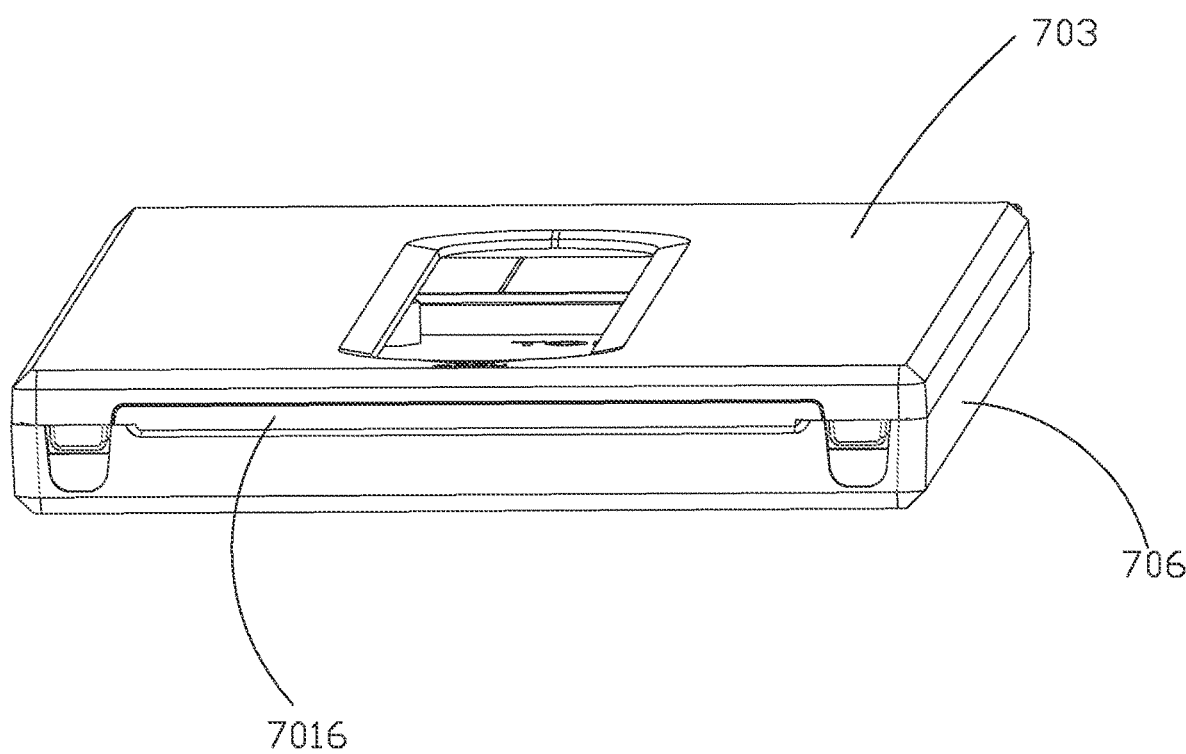
FIG. 20 is a perspective view of the film-sticking tool according to the fourth embodiment of the present disclosure.

Referring to FIG. 19 and FIG. 20, the film-sticking tool 700 is a film-sticking box. The film-sticking tool 700 includes a lower cover 706, an upper cover 703 that can be closed on the lower cover 706, and a base for positioning the electronic product 300. The upper cover 703 is disposed opposite to the screen 301 after being closed. The base 701 is fixed in the lower cover 706. The fixing member 7014 is arranged on the upper cover 703. One end of the upper cover 703 and the lower cover 706 are rotatably connected, so that the upper cover 703 can be closed and opened relative to the lower cover 706. A cutout is defined at the ends of the upper cover 703 and the lower cover 706 away from the ends where the upper cover 703 is rotatably connected to the lower cover 706 to form a pulling opening 7016.

In order to improve the quality of the film sticking, the sticking film 100 is positioned on the upper cover 703. After the cover is closed, the tempered film is also configured in an inclined state relative to the screen 301, so as to facilitate the control of the sticking film 100 in a single direction. Similarly, the base 701 can be configured to have a structure with a height difference, so that after the electronic product 300 is placed, there is a height difference between the height of the first end 2012 of the tempered film 201 relative to the screen 301 and the height of the second end 2013 of the tempered film 201 relative to the screen 301. The protective layer 440 corresponding to the end with the larger height difference is closely matched with the fixing member 7014, and the protective layer 440 corresponding to the end with the smaller height difference is movably matched with the fixing member 7014. Thus, the attaching direction of the tempered film can be well controlled, and the tempered film at the end with the smaller height difference is attached to the screen 301 first. Due to the protective layer 440 at the relatively higher end and the fixing member 7014 are relatively closely matched, the protective layer 440 is prevented from falling off automatically, that is, the automatic falling of the tempered film can be prevented, which can well ensure that the tempered film is gradually attached from the end with the smaller height difference to the higher end. The end with the smaller height difference is configured to be movably matched, that is, the connection therebetween is relatively loose, which can ensure positioning and alignment, so that the sticking film 100 can be smoothly positioned and aligned with the screen 301 of the electronic product 300. It is avoided that both ends are tightly matched, and the alignment of the sticking film 100 and the screen 301 can be deviated when the manufacturing process is slightly deviated.

Optionally, the distance between the end with the lower height difference, the release film layer 202 and the screen 301 is equal to the thickness dimension of the release film layer 202. That is, the inner surface of the upper cover 703, the sticking film 200 and the screen 301 are in contact with each other successively.

Figure 21:
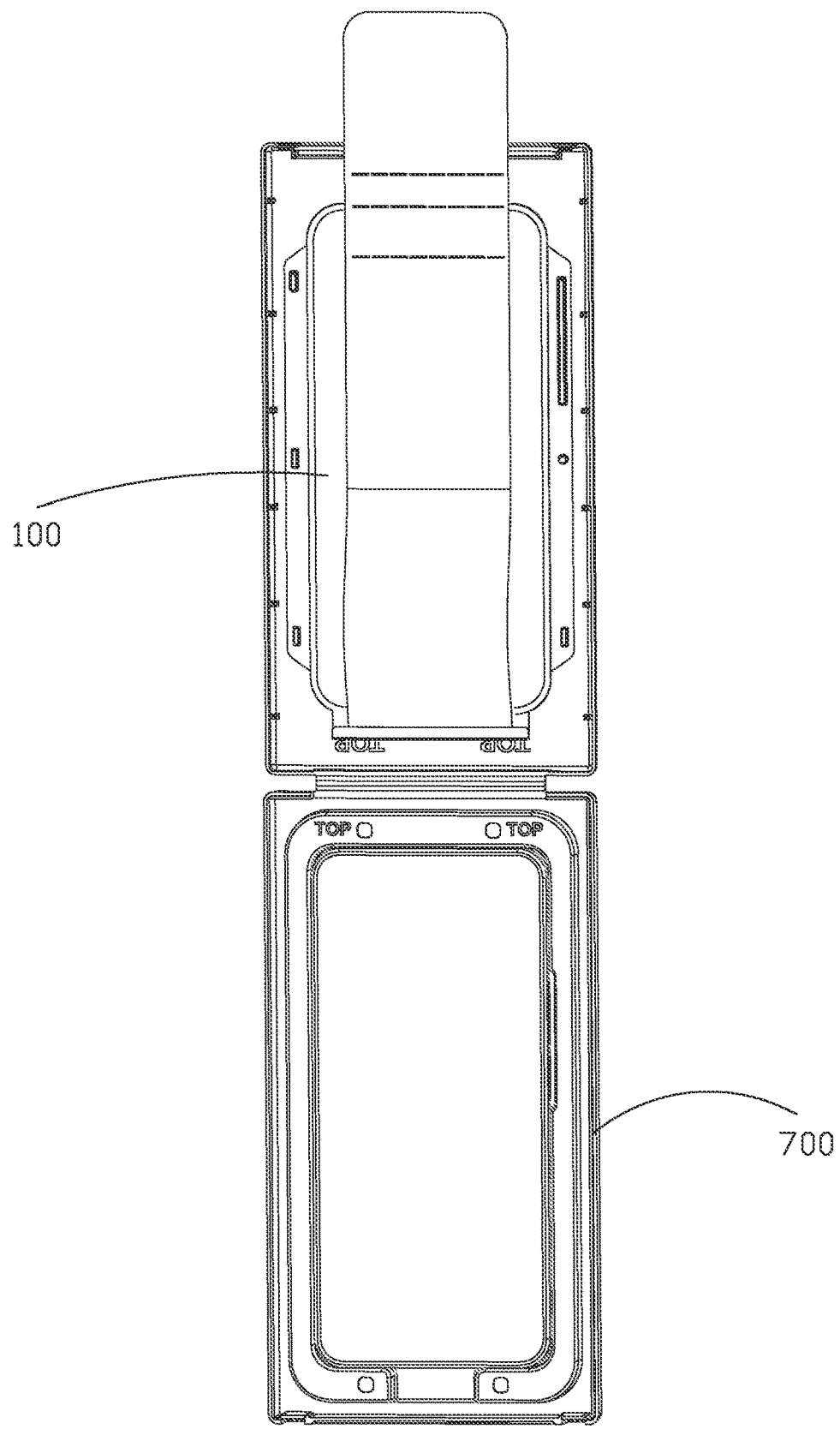
FIG. 21 is a perspective view of the film-sticking assembly according to a fifth embodiment of the present disclosure.

Referring to FIG. 21, a fifth embodiment of the present disclosure provides a film-sticking assembly 800, which includes the sticking film 200 according to the first embodiment, the sticking film 400 according to the second embodiment or the sticking film 100 according to the third embodiment, and the film-sticking tool 600 or the film-sticking tool 700 according to the fourth embodiment. The sticking film can be positioned on the film-sticking tool to complete the sticking of the tempered film of the electronic product.

The foregoing descriptions are only preferred embodiments of the present disclosure, and should not be construed as limiting the scope of the disclosure. Any modifications, equivalent replacements and improvements made within the principles of the present disclosure should be included within the protection scope of the present disclosure.

The invention claimed is:

1. A sticking film, comprising a tempered film for attaching to screen of an electronic product, and a release film layer attached to the tempered film, the release film layer being an electrostatic layer; the release film layer and the tempered film being separated when pasting, and the side of the release film layer that is attached to the tempered film generating static electricity to attract dust on the screen the sticking film further comprises a pulling portion, when the pulling portion is pulled, the side of the release film layer attached to the sticking surface contacting the screen to attract dust.

2. The sticking film according to claim 1, wherein the tempered film having a sticking surface for attaching to the screen of the electronic product;

the sticking surface being attached to the release film layer, the release film layer having ends in the width direction and the length direction thereof;

the tip or the pulling portion being connected to one end of the release film layer; the tip and the release film layer being coplanar and not attached to the sticking surface, or part or all of the pulling portion being positioned on the side of the release film layer away from the sticking surface; the pulling portion extending along the length direction or the width direction of the release film layer.

3. The sticking film according to claim 2, wherein the end of the pulling portion connected with the release film layer is defined as a connecting end; the extension length of the pulling portion along the longitudinal direction being greater than the length dimension of the release film layer, or the extension length of the pulling portion along the width direction being greater than the width dimension of the release film layer; after the pulling portion is formed on the release film layer, a portion of the pulling portion extending beyond the end of the release film layer opposite to the connecting end.

4. The sticking film according to claim 3, wherein when the sticking film is positioned on the film-sticking tool, and when using the film-sticking tool to position the electronic product, the pulling portion is positioned between the release film layer and the screen; there being a space between the release film layer and the screen.

5. The sticking film according to claim 4, wherein when the release film layer is torn off, the sticking surface of the release film layer is in pressing contact with the screen.

6. The sticking film according to claim 4, wherein when the release film layer is torn off, the release film layer is positioned between the tempered film and the screen in a curved shape.

7. The sticking film according to claim 3, wherein the pulling portion and the release film layer are arranged separately, and the pulling portion being connected to the side of the release film layer away from the sticking surface; the end of the release film layer and the pulling portion being superimposed to form a step, and the step contacting the screen to remove dust when pulling the pulling portion.

8. The sticking film according to claim 2, wherein the tempered film comprises a first end and an opposite second end in the length direction or the width direction; the release film layer comprising a sticking portion covering the sticking surface, and a connecting section extending beyond the first end or the second end; the connecting section being connected to the sticking portion;

a folding line being provided to divide the connecting section into a first connecting section and a second connecting section, which are respectively connected to the sticking portion and the pulling portion; the extension direction of the folding line being perpendicular to that of the connecting section; the first connecting section and the second connecting section being folded along the folding line to form the pulling portion on the side of the release film layer away from the sticking surface.

9. The sticking film according to claim 8, wherein the folding line is formed by a plurality of wire holes or wire grooves arranged at intervals.

10. The sticking film according to claim 1, wherein the release film layer is a PET material.

11. The sticking film according to claim 10, wherein the tempered film has antistatic properties.

12. The sticking film according to claim 8, wherein the sticking film further comprises a protective layer, which is attached to the side of the tempered film away from the release film layer.

13. The sticking film according to claim 12, wherein the protective layer comprises a covering portion covering the tempered film, and a positioning portion extending beyond the covering portion; the positioning portion being provided with a positioning member, which is used to cooperate with a film-sticking tool to position the sticking film.

14. The sticking film according to claim 13, wherein the tempered film comprises a first end and an opposite second end; the film-sticking tool being provided with a fixing member matched with the positioning member; after the sticking film is positioned on the fixing member and the electronic product is positioned in the film-sticking tool, the height of the first end of the tempered film relative to the screen being different from that of the second end of the tempered film relative to the screen, the positioning member corresponding to the end with the larger height difference being closely matched with the fixing member, and the positioning member corresponding to the end with the smaller height difference is movably matched with the fixing member; the protective layer can fall on the screen under the gravity of the sticking film or an external force pressing in the direction of the screen.

15. The sticking film according to claim 14, wherein at the end with the smaller height difference, the distance between the release film layer and the screen is equal to the thickness dimension of the release film layer.

* * * * *